May 23, 1967 J. H. HOLLAND 3,321,748

INFORMATION RETRIEVAL APPARATUS

Filed Feb. 18, 1963 3 Sheets-Sheet 1

INVENTOR
JOHN H. HOLLAND

BY Thomas S. Ross
Joseph R. Spalla
ATTORNEYS

May 23, 1967 J. H. HOLLAND 3,321,748

INFORMATION RETRIEVAL APPARATUS

Filed Feb. 18, 1963 3 Sheets-Sheet 2

INVENTOR
JOHN H HOLLAND
BY Thomas S. Ross
Joseph R Spalla
ATTORNEYS

May 23, 1967 J. H. HOLLAND 3,321,748

INFORMATION RETRIEVAL APPARATUS

Filed Feb. 18, 1963 3 Sheets-Sheet 3

INVENTOR
JOHN H. HOLLAND
BY Thomas S. Ross
Joseph R. Spalla
ATTORNEYS

United States Patent Office 3,321,748
Patented May 23, 1967

3,321,748
INFORMATION RETRIEVAL APPARATUS
John H. Holland, West Hartford, Conn., assignor, by mesne assignments, to Royal Typewriter Company, Inc., a corporation of Delaware
Filed Feb. 18, 1963, Ser. No. 259,096
16 Claims. (Cl. 340—173)

This invention relates to information retrieval apparatus; more particularly it relates to information retrieval apparatus having mechanism operable on command to drive a transducer to a selected address of a removably mounted record storage file and specifically it relates to mechanism for supporting records in said storage file which is operable to position a record at a selected address into operative association with said transducer and with record drive means.

Various systems for retrieval of information from selected records in a record storage file are known to the art. In these systems the movement of a transducer to a selected record location and the movement of the selected record relative to said transducer has involved relatively complex and costly mechanisms or has involved mechanisms which impose limitations on the access time of the system. Further these systems do not lend themselves readily to the removal of the storage files or of individual records in a file whereby files or individual records containing different or changed information may be operatively associated with the address and readout mechanisms. Also the apparatus for programming the transducer in these systems is relatively complex and inflexible.

In accordance with the present invention the foregoing shortcomings are obviated in the provision of an apparatus for removably supporting record storage files and for movably supporting records in said storage files relative to a transducer controlled or positionable by a relatively simple and low cost drive, and further in the provision of mechanism responsive to the movement of said transducer to a selected record location to effect the operation of said record supporting mechanism whereby the record at a selected location is moved into operative association with said transducer and with a record drive means. A feature of the invention resides in the ease of programming the readout of records in a storage file and in the selection of various subprograms in a predetermined overall program.

An object of the invention is to provide a novel low cost relatively simple information storage and retrieval apparatus.

Another object of the invention is in the provision of information storage and retrieval apparatus having a novel storage address mechanism.

Still another object of the invention is to provide a storage address mechanism adapted to be positioned at selected address locations in accordance with presettable programs or subprograms.

Still another object of the invention is in the provision of information storage and retrieval apparatus adapted to removably operatively mount record storage files to facilitate changing record files.

A further object of the invention is in the provision of a novel record disc drive in a record disc type information storage apparatus.

A still further object of the invention is to provide an information storage and retrieval apparatus wherein record disc type storage media are movably supported in a file and adapted to be individually driven relative to a transducer upon movement of the transducer to a selected disc location.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 3:
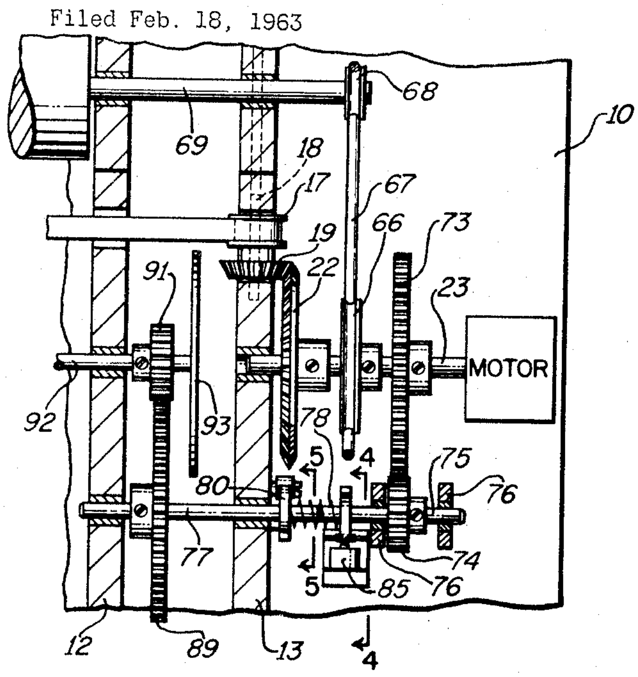
FIGURE 3 is a top elevational view showing details of apparatus drive mechanisms.
Figure 5:
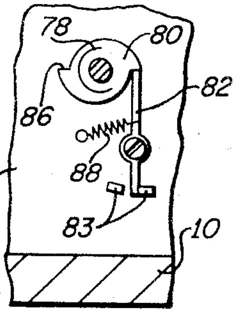
Figure 4:
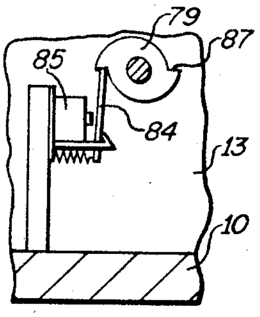
Figures 6, 7:
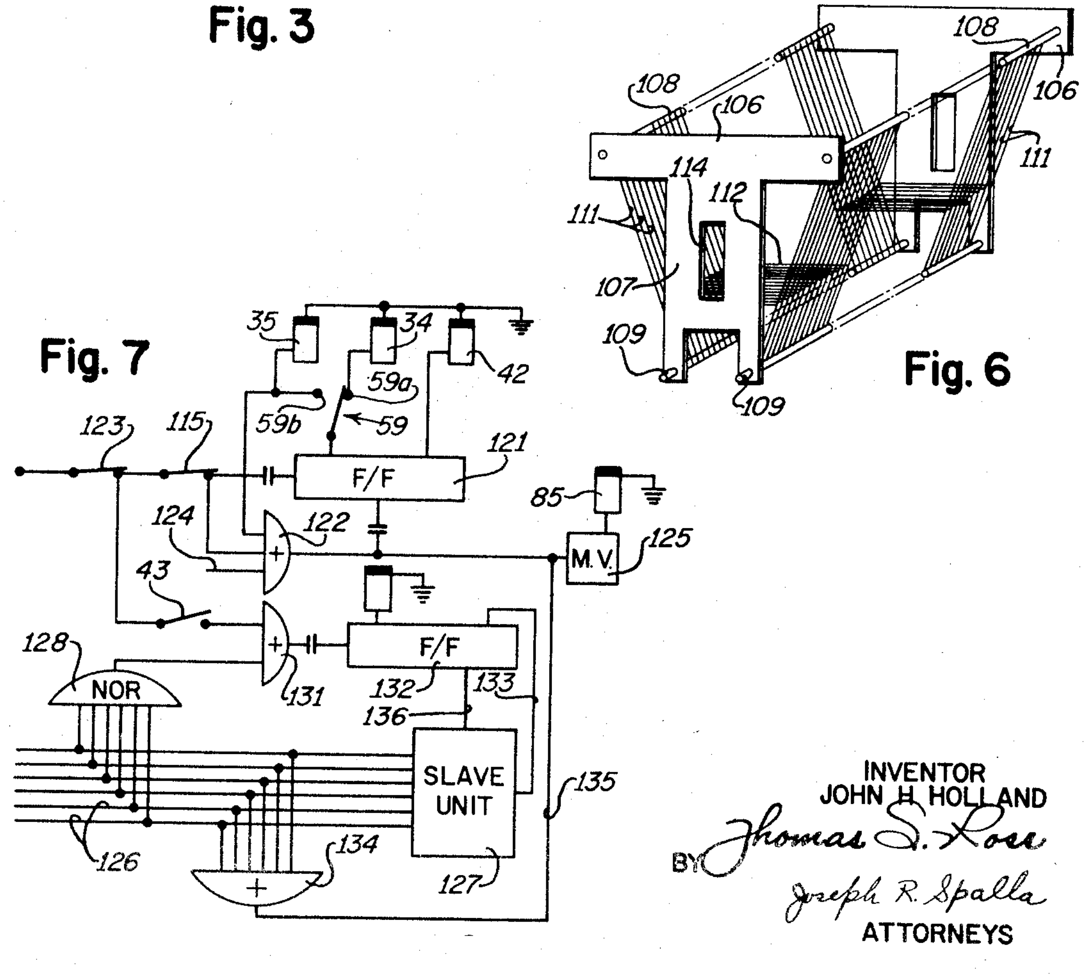

FIGURES 4 and 5 are views taken along lines 4—4 and 5—5 of FIGURE 3 showing the clutch structure;

FIGURE 6 is a perspective view of a disc storage file; and

FIGURE 7 is a logic block diagram showing the electrical elements of the apparatus of the invention incorported with a data processing system.

Figure 1:
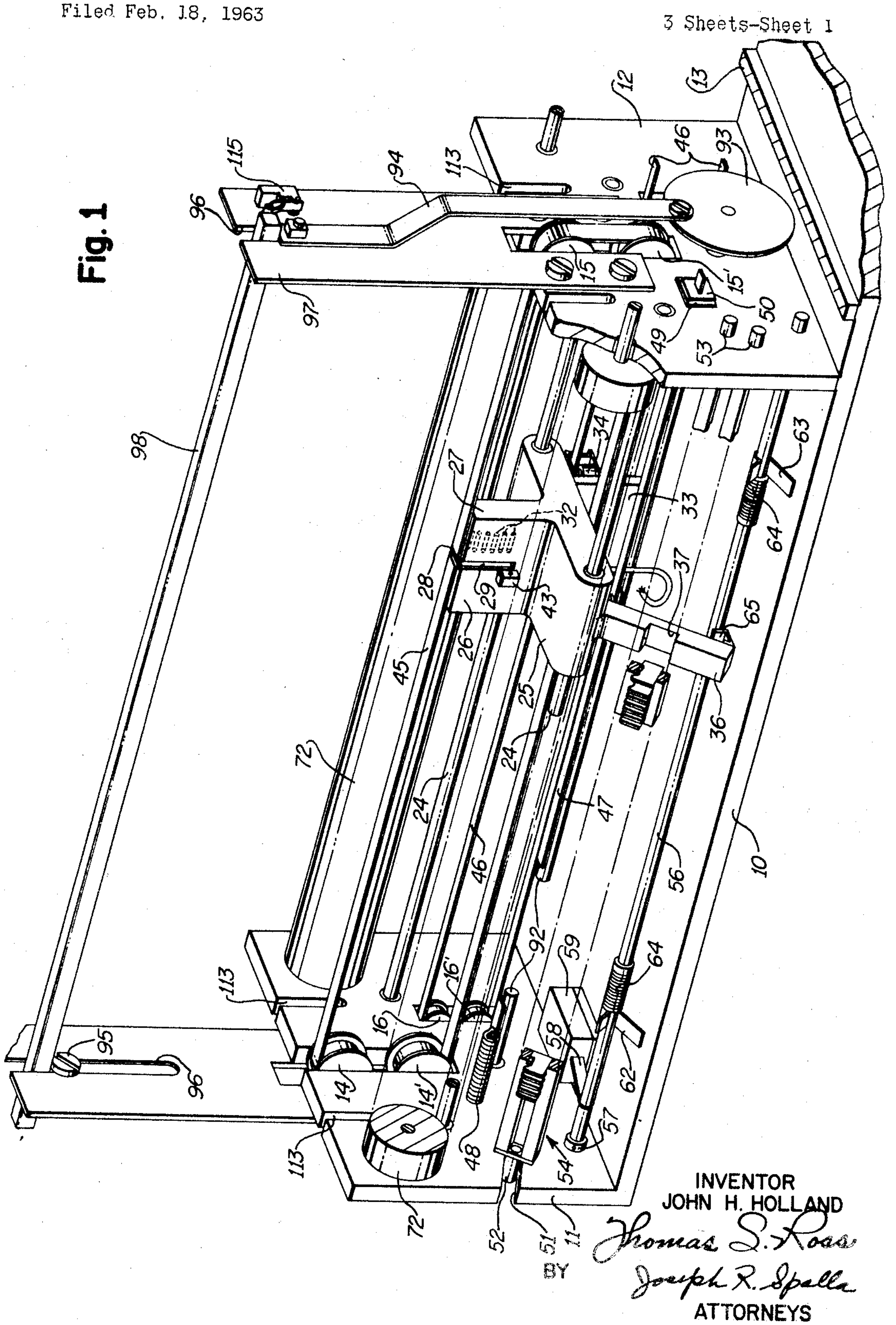
FIGURE 1 is a perspective view showing elements of an information storage and retrieval apparatus in accordance with the invention.

Referring now to the drawings wherein like or corresponding elements throughout the several views are designated by the same reference characters there is shown in FIGURE 1 a frame member comprising a base plate 10, spaced upstanding left and right parallel walls 11 and 12 respectively, and an upstanding wall 13 outwardly of and parallel to wall 12. Mounted centrally of the left and right walls 11 and 12 are pairs of vertically spaced idler pulleys 14–14′ and 15–15′ respectively, having their axes in the plane of the walls. The left wall and wall 13 also respectively mount, rearwardly of and below the first described pulleys, and not so widely vertically spaced, a pair of idler pulleys 16–16′ and a pair of pulleys 17–17′ (FIGURE 3); all of said pulleys being mounted with their axes in the plane of the walls. As shown in FIGURE 3 pulley 17 is secured to a mounting shaft 18 to which is secured a bevel gear 19 which is driven by a bevel gear 22 drivingly connected to a continuously rotating motor shaft 23. Pulley 17′ (not shown) is an idler pulley.

Figure 2:
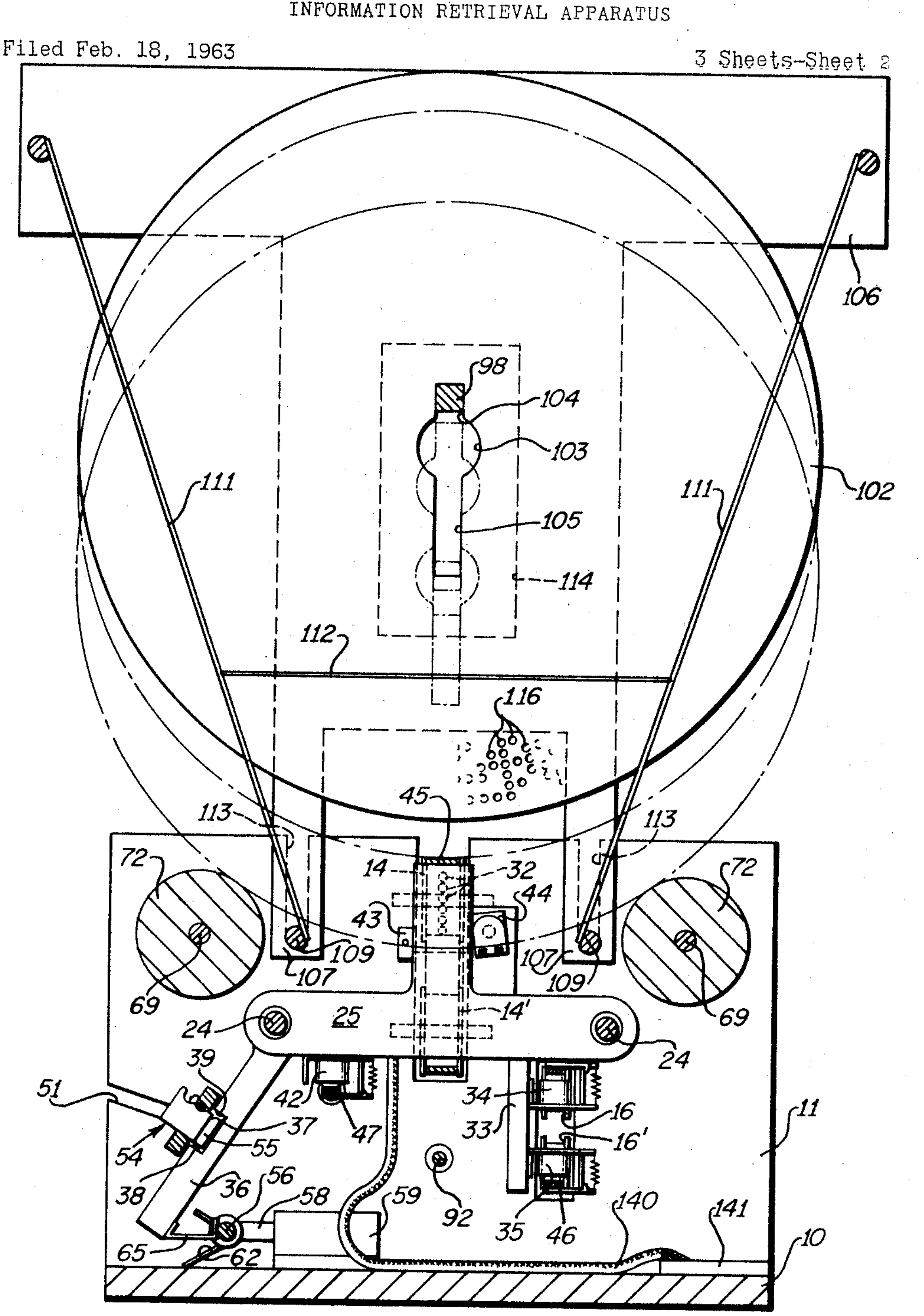
FIGURE 2 is a side elevational view showing details of the carriage positioning elements.

With reference to FIGURES 1 and 2 there is shown fixedly secured to and between the left and right walls 11 and 12 a pair of horizontally spaced carriage guide rails 24 adapted to mount a carriage generally designated by reference numeral 25. The carriage comprises, as most clearly shown in FIGURE 1, spaced upwardly vertically extending sections 26 and 27. Disposed within said sections respectively, and facing the slot 28 formed by said spaced sections and defining a read station, are a light source 29 and a vertical array of photoconductive cells 32. As most clearly shown in FIGURE 2 the carriage also is formed with a vertically depending section 33, located rearwardly of the read station, on which is mounted an upper or right drive electromagnet 34 and a lower or left drive electromagnet 35. The carriage is also formed with a forwardly angularly depending section 36 provided with a rectangular depression 37 in the facing walls of which are mounted a light source 38 and a photoconductive cell 29.

Further as shown in FIGURE 2 the underside of the carriage forwardly of the read station has attached thereto a carriage clamping electromagnet 42; the section 26 of the carriage forwardly of the read station has a lowered disc position detector microswitch 43 secured thereto, and the section 26 of the carriage rearwardly of the read station has attached thereto a disc clamping electromagnet 44. The actuator of the switch 43 extends into the plane of the read slot whereby it will be actuated by a record positioned in the read station. With reference to FIGURES 1 and 2 there is shown a dimensionally stable tape 45, preferably of steel, threaded about pulleys 14–14' and 15–15' in the left and right walls 11 and 12 and attached at its ends respectively to the top of sections 26 and 27 of the carriage. Similarly a continuous loop steel carriage drive tape 46 is mounted about pulleys 16–16' in the left end wall and pulleys 17–17' in wall 13 with its upper and lower runs threaded between the armature and pole pieces of the right and left drive means 34 and 35 respectively; openings being provided in wall 12 to permit the tape 46 to extend between walls 11 and 13.

Further as shown in FIGURE 1 a steel tape 47, which extends between the left and right walls 11 and 12, and which is threaded between the armature and pole piece of the carriage clamping magnet 42, is resiliently secured to the left wall 11 as by a spring 48. The other end of tape 47 extends through the right wall 12, through a damping pad 49, and is secured to a stop plate 50 which serves to prevent the spring 48 from pulling the tape 47 through the right end wall 12 and yet permits the spring to maintain the tape taut.

Further as shown in FIGURE 1 the forward edge of the wall 11 is provided with a rearwardly angled slot 51 and wall 12 is provided with holes. The slot and holes respectively are provided to receive end pin 52 and end pins 53 formed on a conventional tab rack 54 whereby tab rack bars may be removably positioned relative to the rectangular depression 37 formed in the forwardly depending section of the carriage so that set tab stops 55 positioned between light source 38 and cell 39 may be detected by the photoconductive cell 39 as the carriage is driven from left to right.

The apparatus also includes as viewed in FIGURE 1 a rod 56 mounted for limited axial movement between the left and right walls 11 and 12 so as to lie beneath the extremity of the forwardly depending section 36 of the carriage. A pair of end stops 57 secured to the rod permit the axial movement of the rod to the extent that an arm 58 secured to and adjacent the left end of the rod 56 and operatively connected to the movable contact of a form C toggle switch 59 may operate the latter. A pair of C-shaped rod clamps 62 and 63 of plastic or other suitable flexible material frictionally grip the rod but are selectively positionable along the rod. Springs 64 loosely mounted on the rod adjacent to and between the clamps 62 and 63 serve as motion transmitting and carriage shock absorbing springs when engaged by an extension 65 of carriage section 36 thereby, through clamps 62 or 63 effecting the axial displacement of the rod 56 to the right or left as the case may be, thereby operating toggle switch 59. As will hereinafter appear, the clamps 62 and 63, which are detentably positioned relative to the rod and to one another, set the right and left limits of carriage movement. This permits the rapid retrieval of information from a selected series of discs in a disc storage file without the necessity of transversing the whole storage file each time information within a selected series of discs is to be repeated.

Referring again to FIGURE 3, the motor driven shaft 23 has secured thereto a pulley 66 which is adapted via a belt 67 to drive pulleys 68, one only being shown, which are secured to disc drive roller mounting shafts 69. As most clearly seen in FIGURE 2 the shafts 69 are rotatably mounted to either side of the centerline of and between the walls 11 and 12 and carry disc friction drive rollers 72.

The motor shaft 23 also mounts a gear 73 which meshes with a gear 74 on a shaft 75 suitably supported for rotation by bearing supports 76 secured to the frame base plate. Shaft 75 which is axially aligned with a shaft 77 supported for rotation in walls 12 and 13 is adapted to be clutched to shaft 77 by, for example, a wrap spring clutch. More particularly shafts 75 and 77 are surrounded by a wrap spring 78 whose ends are secured to clutch control discs or ratchets 79 and 80 which are rotatably mounted relative to shafts 75 and 77. As is understood by those conversant with wrap spring clutches, the normal diametral dimensions of the spring 78 is such that shafts 75 and 77 are coupled, with rotation of the shafts serving to tighten the grip of the spring. The spring is normally disengaged by relatively rotatably displacing the control ratchets 79 and 80 in a direction which expands the spring. The spring is thus held in disengaged condition by an interponent 82 rotatably mounted between limit stops 83, and by the armature interponent 84 of a clutch electromagnet 85. Interponents 82 and 84 cooperate respectively with teeth 86 formed at 180 degree intervals on the periphery of control ratchet 80 and with oppositely facing teeth 87 formed at 180 degree intervals on the periphery of control ratchet 79. The interponent 82 which is biased as by a spring 88 into a tooth 86 of the control ratchet 82 is suitably rotatably secured to the wall 13. The clutch electromagnet is secured to a support extending from the base plate 10. Energization of the electromagnet 85 removes the armature interponent 84 from an associated step 87 enabling the spring to wrap and couple shafts 75 and 77. After releasing the control ratchet 79, the electromagnet will be de-energized whereby the armature interponent 84 will engage the tooth 180 degrees removed and thereby disengage the spring 78 after 180 degrees of revolution.

As shown in FIGURE 3 a gear 89 secured to shaft 77 drives a gear 91 secured to a transverse shaft 92 which extends between and through the left and right walls 11 and 12. The extremities of the shaft 92 are secured centrally to discs 93 to which lift arms 94 (FIGURE 1) are eccentrically pivoted. As shown in FIGURE 1, the upper ends of the lift arms 94 are provided with a cross stud 95 which guide the lift arms in slots 96 formed in vertical extensions 97. The lift arms 94 are adapted to movably support the ends of a lift shaft 98 which in turn, as shown in FIGURE 2, is adapted to extend through slotted openings in record discs 102 supported in a disc file whereby they may be lifted to inoperative positions. As seen in FIGURE 2 the openings in the record discs comprise a central circular opening 103 and rectangular slots 104 and 105 extending radially from opposite sides of the central opening.

Referring to FIGURE 6 there is shown a disc file comprising a frame having T-shaped end sections 106 with a relatively wide vertical leg 107. Extending between said T-shaped end sections are spaced upper parallel support rods 108 secured to the ends of the horizontal legs of the T-sections and spaced lower parallel support rods 109 secured to and adjacent the vertical edges of the lower ends of the vertical legs of the T-sections. A plurality of parallel rigid disc guide wires 111, spaced to accommodate the discs 102 at tab intervals are secured to and between the upper and lower support rods on one side of the vertical leg of the T section and to and between the upper and lower support rods on the other side thereby forming a V-shaped trough. Cross guide wires 112 are also provided to lend rigidity to the frame structure. The discs 102 deposited in the file will therefore be maintained in parallel spaced relation by the guide wires 111. Further as shown in FIGURE 6 the vertical legs of the T sections between support rods 109 are cut away whereby the file may be mounted in slots 113 provided in the walls 11 and 12 (FIGURE 2) without interfering with tape 45. Also the intermediate portion of the T sections are provided with cutouts 114 whereby the lift shaft 98 may be inserted therethrough and through the slotted holes in the discs and movable between its upper and lower limits. After inserting the lift shaft 98 through the disc file and upon mounting the file, assuming the lift arms 94 are in the raised position shown, an upper disc position microswitch 115 (FIGURE 1) mounted in the path of the right lift arm 94 will be operated by the lift shaft 98 and all of the discs 102 will be supported in raised position (full line) by the lift shaft 98 as shown in FIGURE 2; with the shaft 98 engaging the upper edge of the upper slot 104 of the slotted holes in the discs. When the lift arms 94 are lowered as will hereinafter appear all of the discs will follow shaft 98 to the extent permitted by the carriage tape 45. That selected disc 102 opposite the slot 28 in the carriage however will drop to the extent permitted by drive rollers 72 into a disc read position as shown in FIGURE 2 whereby it can be frictionally driven by the disc feed rollers 72 and whereby it operates lower position detector switch 43.

As will be appreciated from the above when the discs 102 are all in a raised position, the carriage 25 may be moved to the right or left by energizing the right or left drive magnets 34 or 35 which will clamp the drive tape between associated armature and pole piece and be carried along by said tape 46 until the magnet is de-energized. Further as will hereinafter appear, as the carriage 25 moves in a right hand direction, tab stops 55 which are set will be detected by cell 39 and thereby effect the de-energization of the right drive magnet 34 and energization of the clamp magnet 42 which is adapted to clamp the resiliently mounted tape 47 thereby to lock the carriage in position; the resilient mounting of tape 47 dissipating the energy due to carriage momentum by permitting the carriage to overtravel, but effecting its return to the selected position.

While a conventional tab rack and photoconductive tab sensor have been described above it is to be understood that tab positions may be represented by contacts sensible by a brush reader secured to the carriage section 36. Selected contacts may be preconditioned in accordance with a predetermined program as fully disclosed in Patent 2,988,193 or in accordance with an address code as fully disclosed in Patent 2,988,194; the latter permitting random access to discs in the file.

In accordance with the embodiment chosen for illustration information is recorded in the discs 102 in the form of perforated binary code groups 116 (FIGURE 2) sensible by the photoconductive cells 32 housed in the carriage read station corresponding to each bit position of the codes. It is to be understood however that magnetic records and magnetic transducers could be employed as well.

Referring now to FIGURE 7 there is shown a logic block diagram of circuitry for controlling the selection of a particular disc 102 and readout of coded information from the selected disc in the record file. The logic circuitry comprises a flip flop circuit 121 having connected to its normally conducting side the carriage clamp magnet 42 and having connected to its normally non-conductive side the common contact of toggle switch 59 whose stationary contacts **59*a* and 59*b* are connected to the right drive and left drive magnets 34 and 35 respectively. The stationary contact 59*b* is also connected to a tab AND gate 122 so that when contact 59*b* is made the AND gate will be blocked during left or return travel of the carriage. The flip flop 121 is adapted to be set when a program on switch 123 is closed provided the upper disc position switch 115 is closed. The stationary contact of the upper disc position switch 115 is also connected to the tab AND gate 122 as is the output line 124 of the tab position photoconductive cell 39. The output of the tab AND gate 122 is A.C. coupled to the reset terminal of the flip flop 121 whereby the latter will be reset on the leading edge of the tab signal and is also connected to the trigger terminal of a one shot multivibrator 125 which has connected thereto the clutch magnet 85** whereby the latter will be energized over the active interval of the multivibrator.

The output lines 126 from the bit transducers 32 are connected to a buffer in a slave unit 127, such as the code printer apparatus disclosed in copending application 209,593, now Patent 3,213,195, which is operative to process the data after receiving a start process signal and to generate a not in process signal after processing the data or, if the code detected is not a printer function to generate a not in process signal a predetermined time after generation of the nonprinter function code.

As shown in FIGURE 7 the bit lines 126 are connected to a NOR circuit 128 which generates an output pulse in response to the energization of any of the bit lines 126. The NOR circuit output is ANDED in an AND gate 131 with a program on signal which is present at the input of the AND gate 131 when the lower position switch 43 is closed. The output of the AND gate 131 is A.C. coupled to a disc clamp flip flop 132 whose normally non-conducting half is connected to the disc clamp magnet 44 and whose normally conducting half is connected to the start process line 133 of the slave unit 127. A home or end of data signal from a home code detector 134 is connected over line 135 to the one shot multivibrator 125 to trigger the latter and thereby energize the clutch solenoid 85 after all the data has been read from a record and processed.

The not in process signal from the slave unit 127 generated after the code on lines 126 has been processed is connected over line 136 to the reset terminal of flip-flop 132 thereby to reset the latter.

As shown in FIGURES 1 and 2 electrical power to and signals to and from the elements in the carriage are carried by wires of sufficient length within flexible cabling 140 secured between carriage and a terminal board 141.

*Operation*

Assume the carriage is positioned at the leftmost position, a disc file is mounted and the lift arms 94 are raised. In this assumed state the upper switch 115 will be closed, the lower switch 43 open, and the toggle switch 59 will be in the right drive position as shown in FIG. 7 and flip flop 121 will be in its reset state whereby the carriage clamp magnet 142 will be energized. Upon closure of the program on switch 123, flip flop 121 will be set by the leading edge of the signal generated by switch closure. Also tab AND gate 122 will be enabled, as two of its inputs will now be true. When flip flop 121 sets, the forward feed magnet 34 will be energized while the carriage clamp magnet 42 will drop out, permitting carriage movement. When a set tab stop 55 is sensed the signal on line 124 will cause the enabled tab AND gate 122 to go true thereby resetting flip-flop 121 and triggering the one shot multivibrator thus energizing the clutch magnet 85 which will effect the lowering of shaft 98 and thereby permit all discs 102 to drop. Consequently the upper switch 115 will open, and a selected disc upon dropping into the read slot of the now stationary carriage will close lower switch 43. The selected disc will be driven by rollers 72 and the leading edge of the first code detected will generate a signal at the output of AND gate 131 thereby setting flip flop 132 which will energize the disc clamp magnet 55 whereby the disc will be held stationary between the armature and pole piece thereof, and also generate a start process signal over line 133 which will effect the processing of the detected code by slave unit 127. After the code on lines 126 has been processed, a not in process signal on line 136 will reset flip flop 132 thereby de-energizing the disc clamp magnet 44, permitting the selected disc 102 to be fed another increment whereby another code will be detected, the disc clamped, and the code on lines 126 processed. When a home code in the selected disc 102 is detected the slave will go in process but since no provision will have been made to process a home code in the slave, it will issue a not in process signal on line 136 thereby resetting the clamp flip flop 132. The home signal over line 135 will trigger the one shot multivibrator 125 and thus energize the clutch magnet 85 which will raise all the discs 102 effecting the opening of the lower switch 43 and the closing of the upper switch 115. It is to be noted that since multivibrator 125 will be triggered before a not in process signal resets the flip flop 132 the disc 102 in the read slot will be forcibly withdrawn from the disc clamp magnet 44 before the latter is de-energized.

The closure of the upper position switch 115 will cause flip flop 121 to be set again whereby the carriage 25 will move until another set tab 55 is detected. As before the disc at the selected location will be read out. If after reading out a selected disc, and if no further tabs are set, the carriage will move until the prepositioned clamp 63 is reached which will operate the toggle switch 59 thereby energizing the reverse feed magnet 35. The transfer of the toggle switch 59 will also disable tab AND gate 122 whereby no set tabs can be sensed during left or return movement of the carriage. Upon reaching the leftmost end or the left prepositioned clamp 62 the toggle switch 59 will retransfer thereby setting again flip flop 121 thus re-energizing the forward feed magnet 34 and enabling the tab AND gate 122. Hence the carriage will move until a set tab is detected, operation being as above.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Data retrieval apparatus comprising a frame,
a carriage movable relative to said frame, said carriage having a slot defining a read station,
transducer means located in and facing said slot,
selectively conditionable carriage position determining means located at uniform intervals parallel to the path of said carriage,
means carried by said carriage for sensing conditioned carriage position determining means,
a shaft,
means supporting said shaft above said carriage and operative to move said shaft between upper and lower positions relative to and parallel to the path of said carriage,
a plurality of centrally slotted discs having data radially recorded therein axially mounted on and movable relative to said shaft,
means for maintaining said discs axially spaced at intervals corresponding to the spacing intervals of said carriage position determining means,
spaced drive rollers parallel to said carriage path mounted on said frame, said shaft maintaining said discs above said drive rollers and out of the path of said carriage when in its upper position,
drive means,
means on said carriage operative to engage said drive means for initiating carriage movement,
and means responsive to the detection of a conditioned carriage position determining means for effecting the arrest of carriage movement and operative on said shaft supporting means to effect the movement of said shaft to its lower position whereby a selected disc enters said slot and is frictionally peripherally driven by said rollers to thereby permit data recorded in said selected disc to be read.

2. Apparatus as recited in claim 1 wherein said drive means comprises a continuously driven loop of tape having runs parallel to the direction of carriage movement, and wherein said means operative to engage said drive means comprises an electromagnet, one run of said tape being threaded between the armature and pole piece of said electromagnet whereby when said electromagnet is energized said carriage is coupled to said tape.

3. Data retrieval apparatus comprising a frame,
a carriage mounted for transverse movement relative to said frame having a slot defining a read station wherein transducer means is located,
selectively conditionable elements located at uniform intervals along the path of movement of said carriage,
means carried by said carriage for detecting conditioned elements,
a transverse shaft,
shaft support means operative between upper and lower limits,
a plurality of centrally slotted discs having data radially recorded therein axially mounted on said shaft,
means for maintaining said discs axially spaced at intervals corresponding to the spacing intervals of said conditionable elements,
spaced drive rollers mounted transversely on said frame to either side of the path of said carriage, said shaft and support means maintaining said discs above said drive rollers and out of the path of said carriage when said support means is positioned at its upper limit,
drive means,
means on said carriage operative to engage said drive means to initiate carriage movement,
first means responsive to the detection of a conditioned element for disengaging said last named means,
and second means responsive to the detection of a conditioned element for positioning said support means at its lower limit whereby a disc at the location corresponding to a conditioned element is lowered into said slot and into peripheral engagement with said drive rollers.

4. A data retrieval system comprising a frame having spaced left and right side walls,
a carriage mounted for transverse movement relative to said frame and to a plurality of discs,
a disc read station in said carriage adapted to receive a record disc,
a drive and a driven pulley mounted in said left and right walls respectively,
a continuous loop supported by said pulleys having an upper and a lower run,
a first and second drive electromagnet mounted on said carriage, said upper and lower runs being threaded between the armature and pole pieces respectively of said first and second drive magnets,
a plurality of discs having data radially recorded thereon,
continuously driven disc drive rollers,
a common transverse bar extending through the axis of said discs operable between an upper and a lower position whereby said discs are maintained in a raised position above said carriage path and movable into the path of said carriage respectively when said bar is positioned in its upper and lower positions,
means for restricting all of said discs except a disc at a selected location from moving into said read station and into peripheral engagement with said drive rollers when said bar is lowered,
means for energizing said first electromagnet whereby said carriage is coupled to said loop,
and means responsive to the movement of said carriage to a preselected disc location for de-energizing said first electromagnet and for lowering said bar whereby a selected disc may be driven by said rollers relative to said read station.

5. In a data retrieval system comprising a frame and a carriage mounted for movement relative to said frame,
an electromagnet mounted on said carriage,
a loop of tape supported on said frame,
means for continuously driving said loop of tape,
at least one run of said tape being parallel to the direction of movement of said carriage and threaded between the armature and pole piece of said electromagnet, means for energizing said electromagnet whereby said carriage is clamped to and carried by said tape, and means responsive to the movement of said carriage to a predetermined position relative to said frame for de-energizing said electromagnet.

6. In a data retrieval sytem comprising a frame and a carriage movable relative to said frame, right and left drive electromagnets secured to said carriage, a continuously driven tape loop having its runs parallel to the path of said carriage with its upper and lower runs threaded respectively between the armature and pole pieces of said right and left electromagnets, a carriage arresting and positioning tape resiliently mounted on said frame and extending parallel to the path of said carriage, a normally energized clamping electromagnet secured to said carriage normally engaging said tape between its armature and pole piece, means for de-energizing said clamping electromagnet and for energizing said right electromagnet whereby said carriage is clamped to and driven by said continuously driven tape, and means responsive to the movement of said carriage to a selected location for de-energizing said right electromagnet and for energizing said clamp magnet whereby said carriage will be arrested and positioned at said selected location.

7. Apparatus as recited in claim 6 further comprising means responsive to the movement of said carriage to a predetermined right limit position for de-energizing said right electromagnet and for energizing said left electromagnet, and to the movement of said carriage to a predetermined left limit position for de-energizing said left electromagnet and energizing said right electromagnet.

8. Apparatus as recited in claim 7 wherein said means responsive to the movement of said carriage comprises a transverse bar supported for limited transverse movement relative to said frame, adjustable right and left limit stops secured to said bar, and a toggle switch operable in response to movement of said bar upon engagement of said carriage with said limit stops.

9. A data retrieval system comprising a frame, a carriage mounted for transverse movement relative to said frame, a plurality of record discs having data recorded along radial increments, means supporting said discs in axially spaced relation above and out of the path of said carriage whereby said carriage may be positioned relative to said discs, means for positioning said carriage at a selected disc location, a read station on said carraige adapted to receive a selected dics, continuously driven disc drive rollers, means responsive to the movement of said carriage to a selected disc location operable on said disc supporting means to thereby permit the selected disc to drop into said read station and into peripheral frictional engagement with said drive rollers whereby radially recorded data is successively presented at said read station for processing, a disc clamping electromagnet on said carriage adapted when energized to clamp said disc between its armature and pole piece thereby to prevent movement of said disc, and control means responsive to data detected at said read station for energizing said clamping electromagnet over intervals required to process successively presented data.

10. Apparatus for reading data recorded in record discs, said data being recorded in successive radial increments adjacent the periphery of said discs, a read station defined by a slot adapted to receive said discs, transducer means facing said slot, continuously driven spaced rollers adapted to peripherally frictionally drive a disc located in said read station, and means responsive to the detection of data by said transducer means for clamping said disc over intervals sufficient to permit successively recorded data to be processed.

11. Data retrieval apparatus comprising a frame having right and left side walls, a disc file removably supported by said frame side walls, a plurality of centrally slotted discs removably supported in axially spaced relationship in said file, said discs having codes recorded therein adjacent the periphery thereof along radial lines, spaced drive rollers supported by said frame side walls adapted to peripherally frictionally drive a selected one of said discs relative to a read station, a transverse shaft extending axially through the slots in all of said discs, said shaft in a raised position supporting said discs above said drive rollers and in a lowered position allowing said discs to move relative thereto toward engagement with said drive rollers, a carriage supported for movement axially of and below said discs, said carriage having a slot defining a read station, code transducers located on said carriage and facing said slot, means movable with said carriage for arresting the lowering of all of said discs except the one opposite said carriage slot, frame supported program means having selectively conditionable elements located at each disc position, a carriage supported transducer for sensing conditioned elements during forward carriage movement, forward carriage drive means enabled to drive said carriage when said shaft is in raised position and disabled in response to the sensing of a conditioned one of said elements, shaft position control means including a shaft position detector switch, said shaft position control means being operative in response to the sensing of a conditioned element for lowering said shaft whereby a selected disc drops into said carriage slot and into peripheral engagement with and is driven by said drive rollers to serially present codes recorded therein to said code transducers, said shaft position control means being operative in response to the detection of a control code in said disc to raise said shaft, thereby reenabling said forward carriage drive means to move said carriage to another disc location whereat another selected disc may be positioned in said carriage slot.

12. Apparatus as recited in claim 11 further including reverse carriage drive means, switch means operable in response to forward movement of said carriage to a first limit position for disabling and enabling said forward and reverse carriage drive means respectively, and to reverse movement of said carriage to a second limit position for disabling and enabling said reverse and forward carriage drive means respectively.

13. Apparatus as recited in claim 12 further comprising means for rendering said shaft position control means ineffective during reverse carriage movement.

14. Apparatus as recited in claim 11 further comprising means enabled when said carriage drive means is disabled for arresting and holding said carriage positioned.

15. Apparatus as recited in claim 12 wherein said forward and reverse carriage drive means includes a continuously driven tape loop having runs parallel to the direction of carriage movement and carriage supported forward and reverse drive electromagnets operable to clamp the carriage to the upper and lower runs of said loop.

16. Apparatus as recited in claim 11 further comprising a positioned disc detector switch located in said carriage slot, a carriage supported disc clamping magnet adapted when energized to clamp and prevent rotation of said disc by said rollers, and circuit means responsive to operation of said switch and to signals representing each code read from said disc for energizing said clamping magnet over intervals required to process the codes presented to said code transducers.

References Cited by the Examiner

UNITED STATES PATENTS

| | | | |
|---|---|---|---|
| 3,064,887 | 11/1962 | Waters | 235—61.11 |
| 3,221,302 | 11/1965 | Silverberg | 340—146.3 |
| 3,231,685 | 1/1966 | Kuehnle | 179—100.2 |

MAYNARD R. WILBUR, *Primary Examiner.*

R. E. COUNCIL, *Assistant Examiner.*